United States Patent
Machi et al.

(10) Patent No.: US 7,645,053 B2
(45) Date of Patent: Jan. 12, 2010

(54) ROTATIONALLY SYMMETRICAL LED-BASED ANTI-COLLISION LIGHT FOR AIRCRAFT

(75) Inventors: Nicolo F. Machi, Marysville, OH (US); Jeffrey M. Singer, Fairborn, OH (US); Brian J. Barnhart, New Carlisle, OH (US)

(73) Assignee: Honeywell International Inc., Morristown, NJ (US)

( * ) Notice: Subject to any disclaimer, the term of this patent is extended or adjusted under 35 U.S.C. 154(b) by 391 days.

(21) Appl. No.: 11/035,365

(22) Filed: Jan. 13, 2005

(65) Prior Publication Data

US 2006/0007012 A1  Jan. 12, 2006

Related U.S. Application Data

(60) Provisional application No. 60/585,529, filed on Jul. 6, 2004.

(51) Int. Cl.
*F21V 1/00* (2006.01)
*B64D 47/06* (2006.01)

(52) U.S. Cl. ............... 362/241; 362/470; 362/231; 362/240; 362/249; 362/298; 340/982; 340/815.45

(58) Field of Classification Search ........... 362/231, 362/238, 240, 241, 247, 249, 298, 302, 470; 340/982, 471, 815.45
See application file for complete search history.

(56) References Cited

U.S. PATENT DOCUMENTS

| | | | |
|---|---|---|---|
| 4,527,158 A * | 7/1985 | Runnels ................ 340/981 |
| 5,685,637 A | 11/1997 | Chapman et al. |
| 5,765,940 A * | 6/1998 | Levy et al. ............ 362/240 |
| 5,769,532 A * | 6/1998 | Sasaki ................. 362/241 |
| 5,806,965 A | 9/1998 | Deese |
| 5,890,794 A | 4/1999 | Abtahi et al. |
| 6,183,100 B1 * | 2/2001 | Suckow et al. ........ 340/471 |
| 6,244,728 B1 | 6/2001 | Cote et al. |
| 6,317,038 B1 * | 11/2001 | Leleve et al. ......... 340/467 |
| 6,367,949 B1 | 4/2002 | Pederson |
| 6,431,728 B1 | 8/2002 | Fredericks et al. |
| 6,456,205 B1 | 9/2002 | Russell et al. |
| 6,461,029 B2 | 10/2002 | Gronemeier et al. |
| 6,464,373 B1 * | 10/2002 | Petrick ............... 362/247 |
| 6,483,254 B2 * | 11/2002 | Vo et al. ............. 340/468 |
| 6,486,797 B1 | 11/2002 | Laidman |
| 6,525,668 B1 | 2/2003 | Petrick |
| 6,621,235 B2 * | 9/2003 | Chang ................ 315/216 |
| 6,628,252 B2 * | 9/2003 | Hoshino et al. ........ 345/82 |
| 2002/0075679 A1 | 6/2002 | Machi et al. |

(Continued)

FOREIGN PATENT DOCUMENTS

EP  1 510 457 A2  3/2005

(Continued)

*Primary Examiner*—Ismael Negron
(74) *Attorney, Agent, or Firm*—Black Lowe & Graham PLLC (57) ABSTRACT

A rotationally symmetrical anti-collision light (100, 200) for an aircraft utilizing light-emitting diodes (LEDs) is mounted to the fuselage of an aircraft. The LEDs (10, 10', 20, 20') may be configured in one or more concentric rings. The anti-collision light includes a reflector (30, 30') configured to redirect the light emitted by at least one of the rings, so that the light pattern satisfies predetermined specifications.

24 Claims, 9 Drawing Sheets

U.S. PATENT DOCUMENTS

| | | | |
|---|---|---|---|
| 2002/0101189 A1* | 8/2002 | Vo et al. ................... | 315/241 S |
| 2002/0105432 A1 | 8/2002 | Pederson et al. | |
| 2003/0193807 A1 | 10/2003 | Rizkin et al. | |
| 2004/0130900 A1* | 7/2004 | Ganzer et al. ................ | 362/470 |
| 2005/0110649 A1* | 5/2005 | Fredericks et al. ..... | 340/815.45 |
| 2005/0122727 A1 | 6/2005 | Machi et al. | |
| 2005/0146884 A1* | 7/2005 | Scheithauer ................ | 362/470 |

FOREIGN PATENT DOCUMENTS

| | | |
|---|---|---|
| WO | WO-01/42083 A1 | 6/2001 |
| WO | WO-02/49917 A1 | 6/2002 |

* cited by examiner

ROTATIONALLY SYMMETRICAL LED-BASED ANTI-COLLISION LIGHT FOR AIRCRAFT

CROSS-REFERENCES TO RELATED APPLICATIONS

This Nonprovisional application claims priority under 35 U.S.C. § 119(e) on U.S. Provisional Application No. 60/585,529 filed on Jul. 6, 2004, the entire contents of which are hereby incorporated by reference.

FIELD OF THE INVENTION

The present invention is directed to aircraft anti-collision lights and, more particularly, to aircraft anti-collision lights utilizing light-emitting diodes (LEDs).

BACKGROUND

Existing anti-collision lights utilize Xenon flash tube technology. However, anti-collision lights using LEDs are advantageous because of their longer lives, lower power consumption, and reduced weight (because a separate power supply is not needed) compared to Xenon-based systems.

Also, in Xenon-based anti-collision lights, providing both visible and covert (infrared) capabilities generally causes the package size to grow. Such dual-mode capability causes the increase in size because infrared (IR) sources cannot be mounted in the same envelope as the Xenon flash tube.

FAR Requirements

Figure 6A:
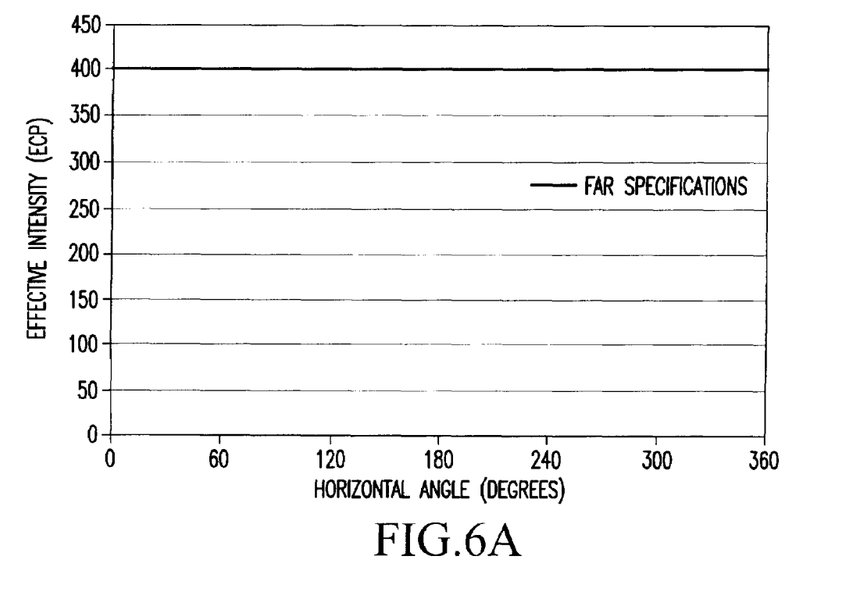
FIGS. 6A and 6B illustrate photometric requirements of the Federal Aviation Regulations (FARs), which an anti-collision light system is designed to satisfy, according to an exemplary embodiment of the present invention.
Figure 6B:
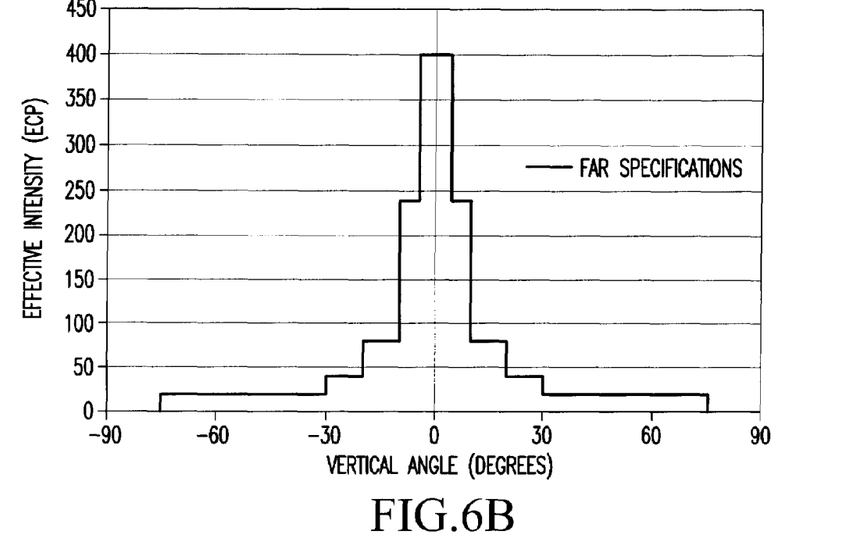

The Federal Aviation Regulations (FAR) requirements for minimum effective intensities for an anti-collision light system are shown in FIGS. 6A and 6B. The FAR photometric requirements are rotationally symmetric about the vertical axis. Thus, for a given vertical angle above/below the horizontal plane of the aircraft, the minimum intensity required for each horizontal angle around the vertical axis is the same. As indicated by FIG. 6A, at a vertical angle of 0 degrees, the effective light intensity must be 400 effective candle power (ECP) for the entire 360-degree horizontal range (i.e., anywhere along the horizontal plane). The following Table 1 includes the minimum effective intensities specified by the FARs (as of the filing date of this application), as illustrated in FIG. 6B.

TABLE 1

| Angle Above/Below Horizontal Plane | Effective Intensity (ECP) |
| --- | --- |
| 0 to 5 degrees | 400 |
| 5 to 10 degrees | 240 |
| 10 to 20 degrees | 80 |
| 20 to 30 degrees | 40 |
| 30 to 75 degrees | 20 |

It should be noted that flash characteristics are specified for anti-collision light systems by the FARs. (Specifically, the FAR specifications set a minimum and maximum effective flash frequency for the system). Thus, the effective intensity of an anti-collision light must be determined using the light's instantaneous intensity as a function of time, and flash duration.

For instance, the Blondel-Rey equation (provided below as Eq. 1) may be used to determine the effective, equivalent intensity of a flashing light compared to a light with a steady-state output. According to the Blondel-Rey equation:

$$Ie = \frac{\int_{t_1}^{t_2} I(t)\,dt}{0.2 + (t_2 - t_1)} \qquad \text{(Eq. 1)}$$

where:
  Ie=effective candle power (ECP)
  (t2−t1)=pulse duration in seconds, and
  I(t)=instantaneous intensity as a function of time.

The coverage illustrated by FIGS. 6A and 6B may be satisfied by multiple light installations, provided that each light meets the required photometric specification for it's respective area. Typically, each red fuselage anti-collision light will cover either the upper or lower portion of the specification, while the white anti-collision lights will cover specific horizontal sections (each wingtip anti-collision light will have 110-degree coverage, and the aft light will cover the remaining 140 degrees).

Considerations in Using LEDs

Red LEDs experience a much higher level of degradation when operated near their maximum allowable junction temperature. Thus, thermal management is important for LED systems, particularly ones using the AlInGaP technologies, which are typically used in red and amber LED's.

Also, it may be advantageous to use flashing LEDs in anti-collision lights to provide more conspicuity to the aircraft. However, synchronizing flashing anti-collision lights on an aircraft with wild frequency power presents certain challenges. Thus, it is a goal to provide synchronized anti-collision lights that flash at a stable rate when powered from a wild frequency bus.

SUMMARY OF THE INVENTION

Exemplary embodiments of the present invention are directed to an aviation red fuselage anti-collision light including a plurality of LEDs.

According to an exemplary embodiment, the LEDs of the anti-collision light are arranged in a rotationally symmetrical manner. Such an optical design is possible, given that the photometric requirements of the Federal Aviation Regulations (FARs) are also rotationally symmetrical.

According to an exemplary embodiment, the rotationally symmetrical configuration of the LEDs in the anti-collision light includes two rings of LEDs. In an exemplary embodiment, the anti-collision light further includes a reflector system that redistributes light from at least one of the LED rings into a pattern that satisfies the photometric distribution specified in the FARs. The use of a reflector system may reduce the number of LEDs used in the anti-collision device, thereby reducing costs and power consumption, while simplifying thermal management.

According to an exemplary embodiment, the anti-collision light includes heat sinking for maintaining the junction temperature of the LEDs at an acceptable level.

According to an exemplary embodiment, the LEDs in one of the two rings may be located at a base portion (or platform) of the anti-collision light, while the LEDs in the other ring are inverted and disposed on a top portion (platform). In such an embodiment, the reflector system may include a first reflector portion for redistributing the light at the base platform, and a second reflector portion for redistributing the light at the top platform. Furthermore, two separate heat sinks may be used in this embodiment to dissipate heat from the two rings of LEDs.

According to an exemplary embodiment, the anti-collision light utilizes flashing LEDs. In an exemplary embodiment, the flashing of the anti-collision lights of an aircraft are synchronized according to an aircraft bus re-synchronization approach.

According to an exemplary embodiment, an electrical control system monitors the status of the LEDs in the anti-collision light to determine whether the light is meeting FAR photometric requirements. In an exemplary embodiment, the electrical control system is designed to detect an LED failure mode, which may cause the anti-collision light not to meet the photometric requirements. The electrical control system may further be designed to shut off the anti-collision light in response to detecting such a failure mode.

According to an exemplary embodiment, the anti-collision light may be configured to operate in visible mode by emitting light in the visible wavelength range. In an alternative exemplary embodiment, the anti-collision light may be configured to operate in a covert mode by utilizing infrared (IR) LEDs to emit light in the IR or near-IR wavelength range. According to another alternative exemplary embodiment, the anti-collision light may be configured for dual-mode operation, which includes both a visible and covert mode.

Further aspects in scope of applicability of the present invention will become apparent from the detailed description provided hereinafter. However, it should be understood that the detailed description and specific embodiments therein, while disclosing exemplary embodiments of the invention, are provided by way of illustration only.

DETAILED DESCRIPTION OF EXEMPLARY EMBODIMENTS

Exemplary embodiments of the present invention are described in the following description.

Given that the photometric requirements of the Federal Aviation Regulations (FARs) for anti-collision lights are rotationally symmetrical, exemplary embodiments of the present invention utilize an optical approach, which is also rotationally symmetrical.

Figure 1A:
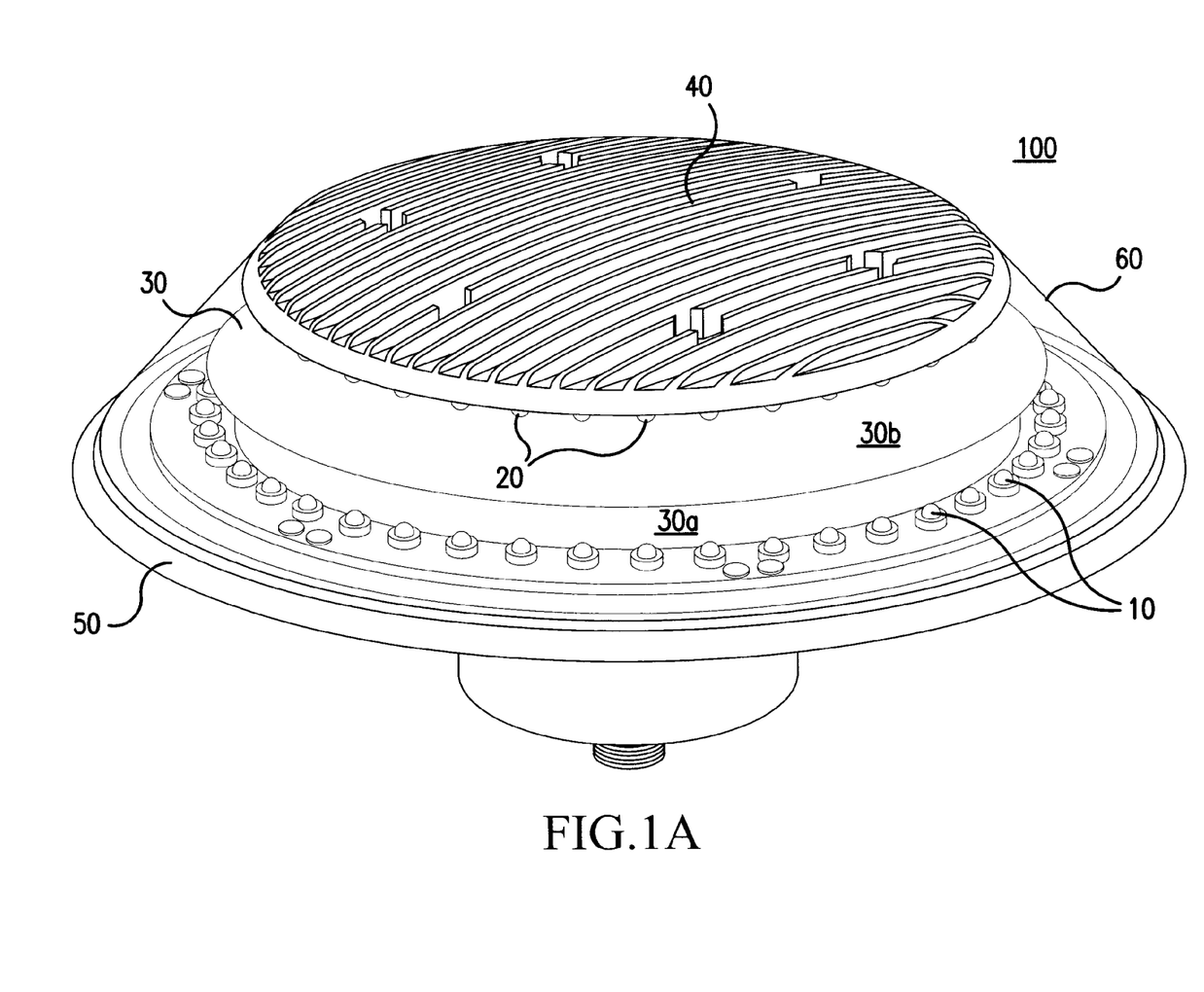
FIG. 1A illustrates a perspective view of an anti-collision light according to an exemplary embodiment of the present invention.
Figure 1B:
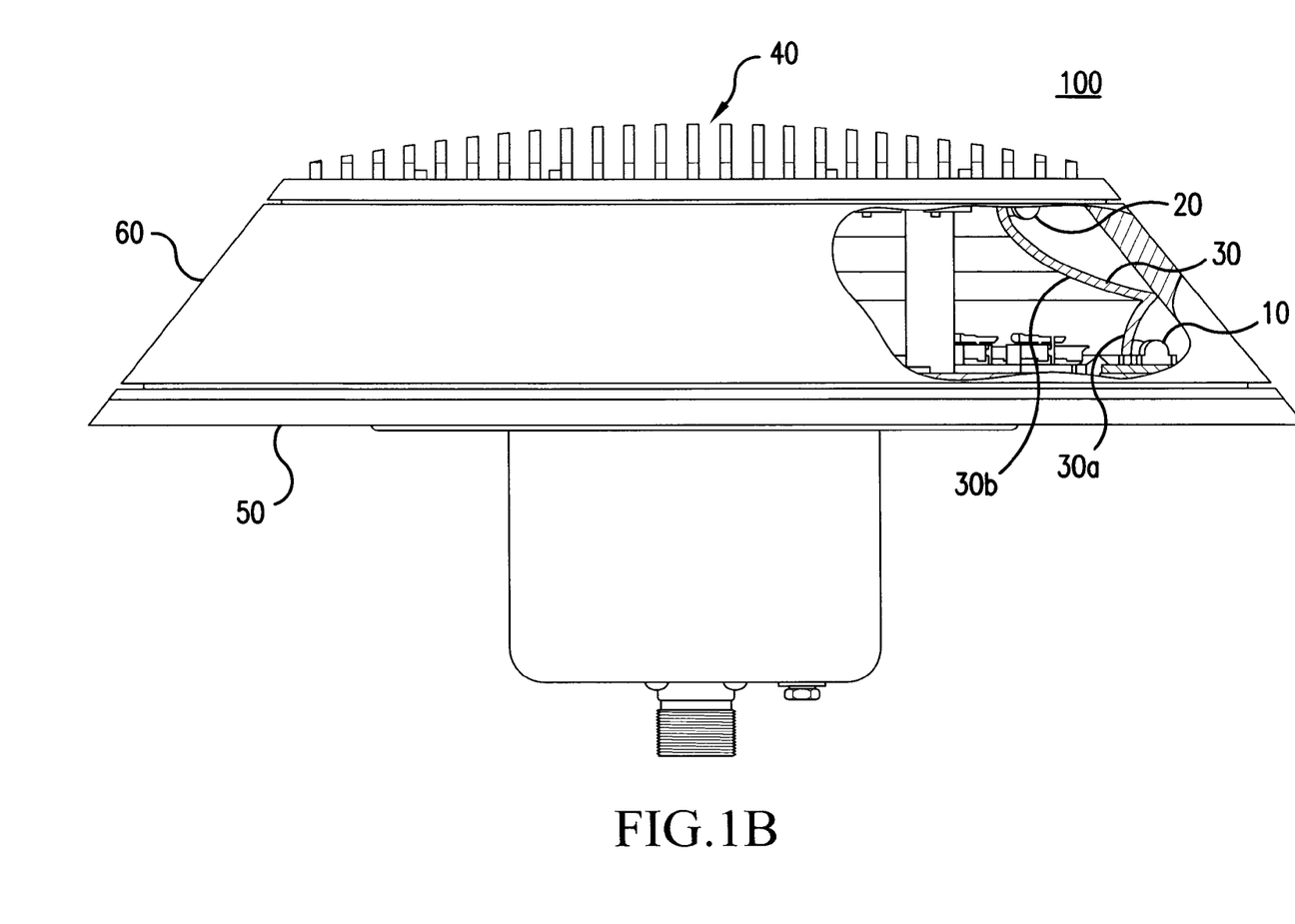
FIG. 1B illustrates a side view of an anti-collision light, in which the interior is partially exposed, according to an exemplary embodiment of the present invention.

FIGS. 1A and 1B illustrate a fuselage-mounted anti-collision light, according to an exemplary embodiment of the present invention. In the anti-collision light 100 of this embodiment, a first ring of LEDs 10 are mounted along the perimeter of a base portion 50 (or "base platform"). A second ring of LEDs 20 are inverted and attached to a top portion 40 ("top platform") of the anti-collision light 100. In an exemplary embodiment, the first and second rings of LEDs 10 and 20 may be substantially arranged in a rotationally symmetric manner (i.e., symmetrical about a vertical axis).

According to an exemplary embodiment, the base platform 50 and top platform 40 each comprises a heat sink for the first ring of LEDs 10 and second ring of LEDs 20, respectively. As shown in FIGS. 1A and 1B, the heat sink corresponding to the top platform 40 may include cooling fins. For example, each of the top platform 40 and base platform 50 may comprise a heat conducting plate that exhibits heat-conducting properties for providing sufficient heat dissipation. The configuration (materials, design, etc.) of the top and base platforms 40 and 50 may vary, of course. It will be readily apparent to those of ordinary skill in the art how to design and create top and base platforms 40 and 50 as heat sinks, which provide the necessary heat dissipation.

Referring to FIGS. 1A and 1B, a reflector 30 is disposed between the top platform 40 and the base platform 50. This reflector 30 may be composed of a first portion 30a for redistributing the light pattern emitted by the first ring of LEDs 10, and a second portion 30b for redistributing the light pattern emitted by the second ring of LEDs 20. Accordingly, this embodiment dedicates a portion of the reflector 30 for redirecting light from each of the first and second rings of LEDs 10 and 20.

In an exemplary embodiment, the first and second portions 30a and 30b of reflector 30 are designed to redistribute the light emitted from the first and second rings of LEDs 10 and 20, respectively, into a pattern that more closely matches the FAR-specified distribution. Consider an example where an upper anti-collision light is mounted on the top of the fuselage, or on the vertical stabilizer, of the aircraft (as illustrated by 100A in FIG. 5). In this example, the first portion 30a may be configured to redirect light from the first ring to satisfy the FARs in a coverage area extending in each horizontal direction, from 0 to 40 degrees above the horizontal plane of the aircraft. In this example, the second portion 30b may be configured to redirect light from the second ring to provide supplemental coverage extending up to, and beyond, 75 degrees above the horizontal plane in each horizontal direction.

Figure 5:
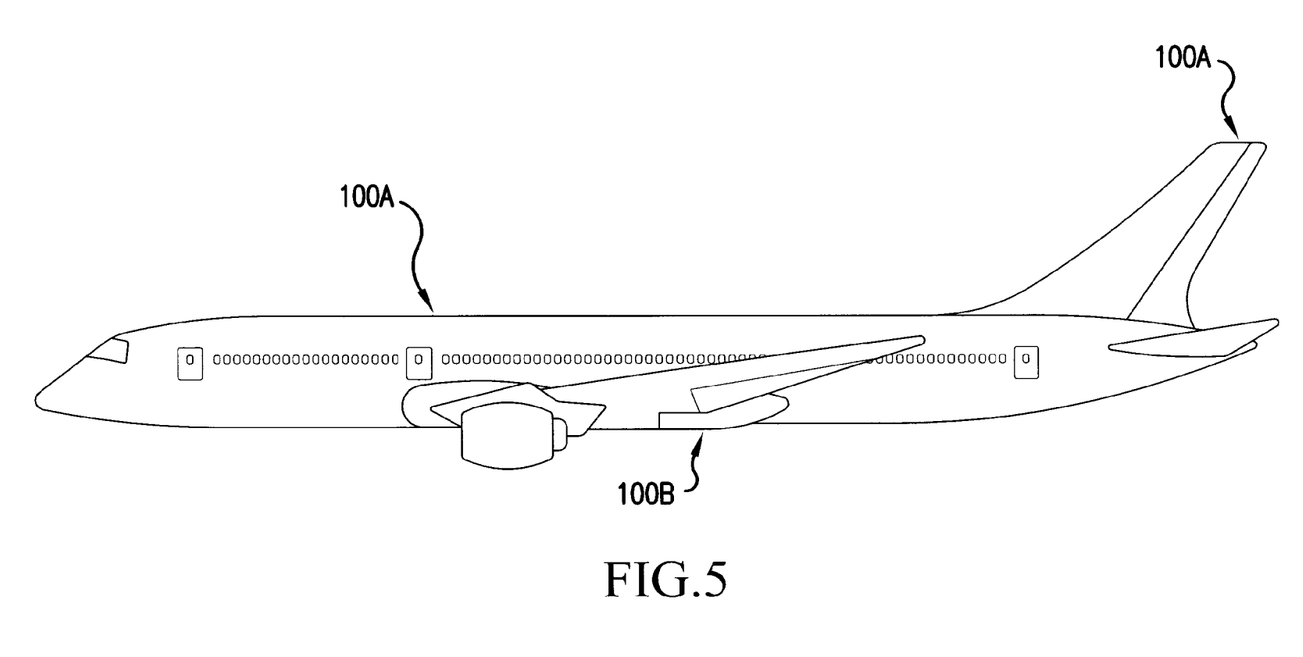
FIG. 5 illustrates locations for an anti-collision light to be installed on an aircraft's fuselage, according to an exemplary embodiment of the present invention.

It should be noted that anti-collision light 100B of FIG. 5 is an example of a lower anti-collision light, which is mounted on the bottom surface of the fuselage. Thus, the lower anti-collision light 100B will be inverted with respect to the light 100 illustrated in FIGS. 1, 2A and 2B (i.e., the "top" platform 40 will actually be below the base platform 50). As such, the first portion 30a and second portion 30b of the reflector 30 will be configured to redirect light from the first and second rings of LEDs 10, 20 in angular coverage areas, which extend below the horizontal plane. For instance, the first portion 30a of reflector 30 may redirect light from the first ring of LEDs 10 in a coverage area (e.g., 0 to 40 degrees) extending below the horizontal plane. for each horizontal direction.

Accordingly, for purposes of this application, when the reflector 30 is described as redistributing light in coverage areas above the "base plane" of the anti-collision light 100, this should be understood as describing either embodiment when the anti-collision light 100 is mounted to the top or bottom of the aircraft's fuselage. According to an exemplary embodiment, the base platform 50 is coplanar with the base plane.

It should be realized that design considerations for the reflector 30 are not limited to satisfying the FAR requirements. The reflector 30 may be configured to redistribute the light from LEDs 10, 20 to satisfy other light distribution requirements extending above the base plane of the anti-collision light 100. For instance, in the aviation industry, various applications may call for anti-collision light specifications that exceed the FAR requirements. Furthermore, those of ordinary skill in the art will realize that the FARs may change. Thus, the present invention should not be limited only to embodiments that redistribute the light to satisfy the FARs at any particular time.

Thus, according to the above exemplary embodiments, the reflector 30 may be used to produce a light distribution that is rotationally symmetric about the vertical axis. The use of the reflector 30 provides advantages over "brute force" optical approaches typically used by conventional LED-based anti-collision lights, because the reflector 30 may be configured to tailor the light distribution to more closely match the FAR requirements.

Specifically, the brute force approach used in existing LED- and Xenon-based anti-collision lights generates more light (thereby consuming more power) than is required to meet FAR requirements because the light is not well controlled. As a result, in such systems, the emitted light pattern might barely exceed the FAR specifications at some areas, while other areas of the pattern exceed the specifications by more than three or four times the required amount. By using such a reflector 30 to tailor the light distribution, it is possible to utilize fewer LEDs, thus reducing power consumption, costs and thermal management issues, while maintaining a high level of margin compared to the FAR intensity specifications.

Various designs for the first portion 30a and second portion 30b of the reflector 30 to redistribute the light from the first and second rings of LEDs 10 and 20, respectively, according to the above-described exemplary embodiment, will be readily known to those of ordinary skill in the art.

According to the exemplary embodiment illustrated in FIGS. 1A and 1B, the anti-collision light 100 experiences improved thermal and aerodynamic characteristics by locating the first ring of LEDs 10 at the top of the light 100, and locating the second ring of LEDs 20 at the bottom of the light 100. By splitting the LEDs 10, 20 in such a manner, the number of LEDs 10, 20, as well as the overall diameter of the light 100, may be reduced in comparison to locating both LED rings on the same plane.

According to an exemplary embodiment, the LEDs 10, 20 in the anti-collision light 100 may be comprised of one-watt, red-orange LEDs. The red-orange color may differ somewhat from the color (red) of the light source in the forward position lights of the aircraft. In such an embodiment, the red-orange LEDs of the anti-collision light 100 are capable of satisfying the aviation red color requirements of the FARs, while having a high efficiency, e.g., 50+ lumens per watt. For example, Luxeon® lambertian LEDs (manufactured by Lumileds™) may be used.

In an exemplary embodiment, the first LED ring (bottom) may contain 42 red-orange LEDs 10, and the second ring (top) may contain 60 red-orange LEDs 20. However, the present invention is not limited to such an embodiment, and the number and color of the LEDs 10, 20 in each ring may vary without departing from the spirit and scope of the present invention.

According to another exemplary embodiment, the anti-collision light 100 may be configured to operate in covert mode by using infrared (IR) LEDs in the first and second rings. For example, surface-mounted AlGaAs LEDs, which have a peak wavelength of 880 nm, may be chosen as the IR LEDs.

In a further exemplary embodiment, a combination of visible (e.g., red-orange) and IR LEDs may be implemented to configure the anti-collision light 100 for dual-mode operation (visible and covert operation). In such an embodiment, 42 AlGaAs LEDs may be integrated with the 42 visible LEDs, which are mounted to the base 50 in the first LED ring. However, the present invention is not limited to such an embodiment, and the number and peak wavelength of the LEDs 10, 20 in each ring may vary without departing from the spirit and scope of the present invention.

Figure 2A:
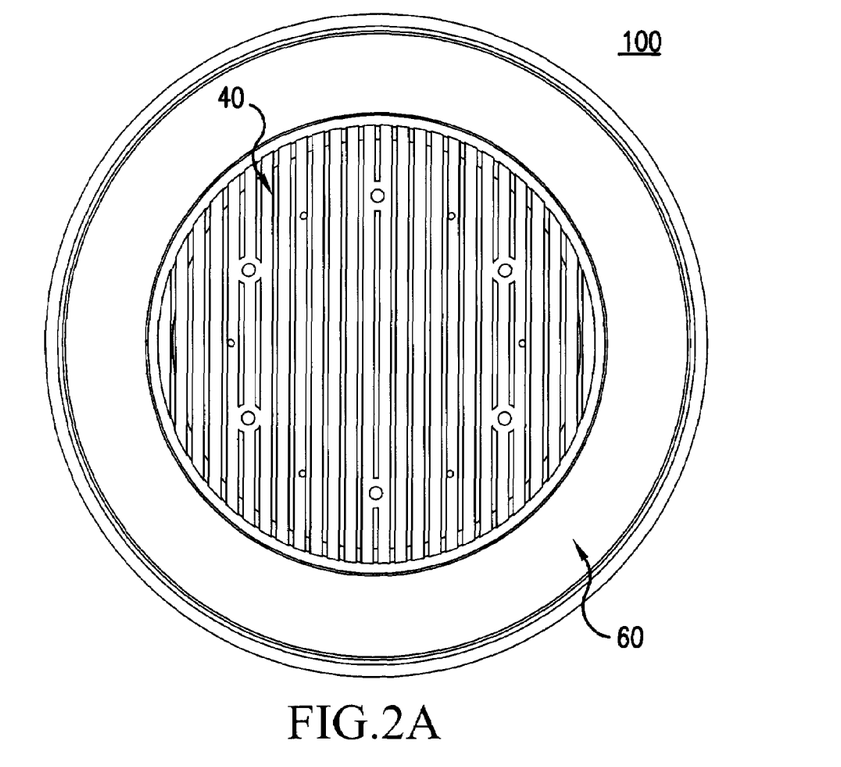
FIGS. 2A and 2B illustrate a top and side view of an anti-collision light, respectively, and provide a more detailed illustration of the mounting scheme and bolt pattern, according to an exemplary embodiment of the present invention.
Figure 2B:
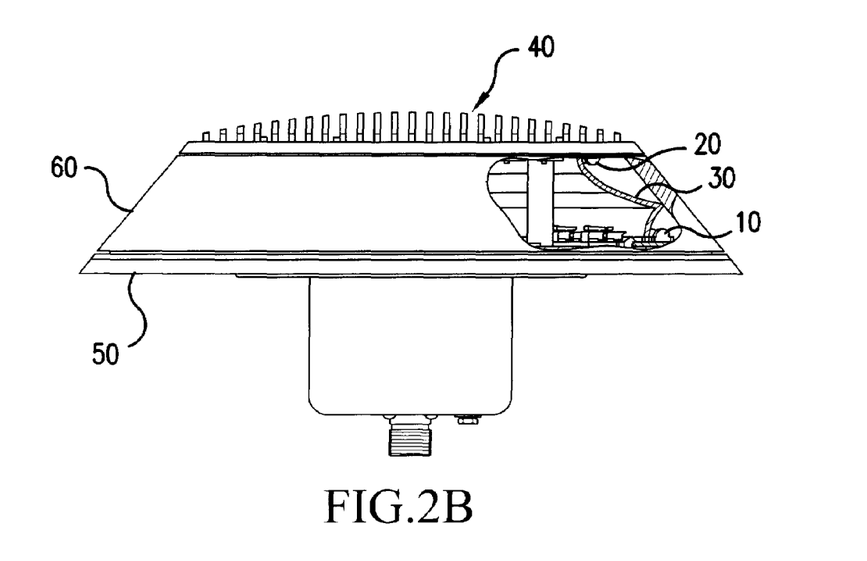

According to an exemplary embodiment, the packaging of the anti-collision light 100 offers the possibility of retrofit and forward fit by maintaining a similar mounting scheme and boll pattern to existing fuselage-mounted anti-collision lights. FIGS. 2A and 2B show a top and side view of the anti-collision light 100, respective, and provide detailed illustration of such a mounting plan and bolt pattern.

Figure 4A:
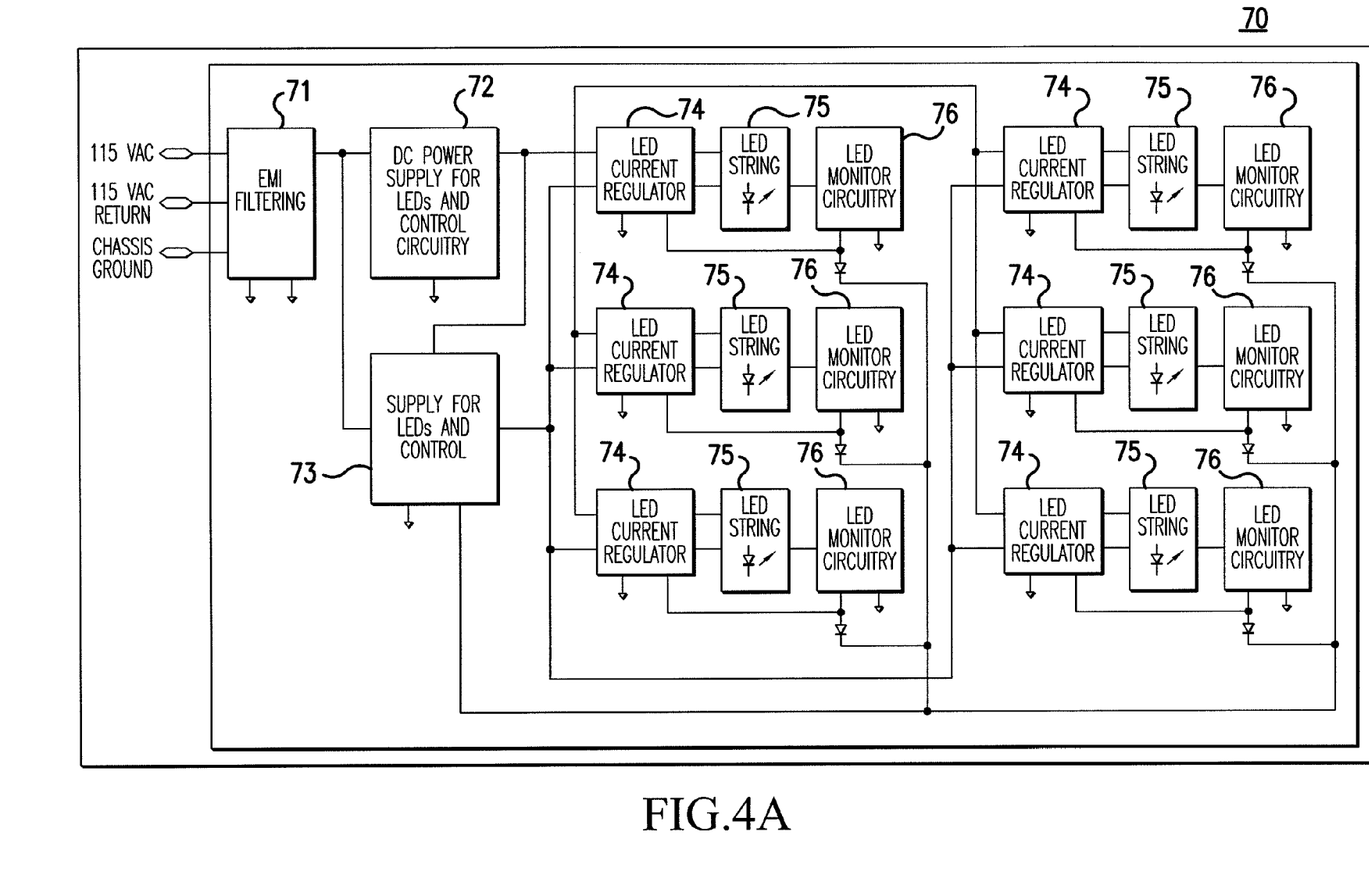
FIG. 4A is a schematic diagram illustrating electrical connections and control for an anti-collision light, according to an exemplary embodiment of the present invention.

FIG. 4A is a schematic diagram of an electrical system 70 (including the electrical connections and control) for the anti-collision light 100, according to an exemplary embodiment. As shown in FIG. 4A, the anti-collision light 100 may be operated directly from a 115 $V_{Ac}$, wild frequency (approximate range of 370-800 Hz) power source. In an exemplary embodiment, control circuitry in the electrical system 70 allows for individual LED failures without shutting down the entire light 100, as will be explained below.

According to the exemplary embodiment illustrated in FIG. 4A, the electrical control system 70 is configured to operate the anti-collision light 100 as a strobe light.

As shown in FIG. 4A, an off-line switch mode power supply 72 may be implemented to convert and reduce the input 115 $V_{AC}$ wild frequency power to a lower DC voltage optimized for the red-orange LEDs 10, 20. As shown in FIG. 4A, the LEDs 10, 20 may be electrically grouped together in "strings" 75. Each string 75 comprises a number (e.g., 17) of LEDs electrically connected in series.

In an exemplary embodiment, the switch mode power supply 72 may be configured to provide a regulated DC voltage of approximately 60 $V_{DC}$ to supply the current regulators 74 for the LED strings 75. Optimizing the amplitude of DC voltage used for the current regulator circuits 74 can maximize circuit efficiency. Each LED current regulator circuit 74 may be configured to maintain the current, which flows the corresponding string 75 of LEDs, at a predetermined level. For example, the LED current regulator circuits may be designed to regulate the LED currents at a level that is determined to maximize LED life at the operating intensity for the anti-collision light 100.

Referring to FIG. 4A, the electrical control system 70 may include an EMI filter 71 to reduce the audio and radio frequency emissions that can be created by the switch mode power supply 72 and load surges inherent in a strobe system. Both common mode and differential mode filtering may be used, as necessary, to minimize emissions and susceptibility.

The flash timer/pulse control circuit 73 in FIG. 4A may be used to control the flashing of the LED array. According to an exemplary embodiment, the flash rate of each LED 10, 20 may be set at 46 flashes per minute. Furthermore, the duration of the flash may be set 300 milliseconds (mS), corresponding to a nominal duty cycle of 23%. Such an embodiment is particularly tailored when Luxeon LEDs are used. Alternatively, the flash timer/pulse control circuit 73 may control the flash rate to be within a range of 41-51 flashes per minute. However, other flash rates and duty cycles may be used, as contemplated by those of ordinary skill in the art.

According to an exemplary embodiment, the amount of heat dissipation to be performed by the heat sinks corresponding to the top platform 40 and the base platform 50 may be designed based on the anticipated power consumption of the upper ring of LEDs 10 and the lower ring of LEDs 20, respectively.

It will be readily apparent, however, that other flash rates and duty cycles may be used. Such parameters may be determined to allow the anti-collision light 100 to meet photometric requirements, based on the type of LEDs (Luxeon, or other types) and power dissipation considerations.

As previously mentioned, the LEDs 10, 20 may be electrically grouped into arrays. For example, the anti-collision light 100 may contain six strings 75 of 17 LEDs. All 17 LEDs in a given string 75 may be wired in series, with current regulators 74 for each of the six strings 75. This approach simplifies the regulation of current in the LEDs while maintaining current regulation in each LED for maximum LED life. Dividing the electronic control into sections also increases the effective redundancy of the light sources.

While FIG. 4A illustrates the LEDs 10, 20 as being grouped into six strings 75, this is merely illustrative. In alternate exemplary embodiments, the LEDs 10, 20 may be grouped into another number (e.g., seven or eight) of strings 75, as will be readily contemplated by those of ordinary skill in the art.

According to an exemplary embodiment, each string 75 of LEDs may contain seven LEDs 10 in the first ring (i.e., "lower LEDs"), and ten LEDs 20 in the second ring (i.e., "upper LEDs"). Such an arrangement is designed to meet photometric performance requirements of the FARs, even when one of the lower LEDs 10 and one of the upper LEDs 20 have failed in one or more strings 75. Thus, this embodiment provides optical redundancy to mitigate the risk of LED failure.

To implement such risk mitigation, the electrical system 70 may include LED monitor circuitry 76 for each LED string 75, as shown in FIG. 4A. The purpose of the LED monitor circuitry 76 is to monitor the operating status of the LEDs in the corresponding LED string 75, and control the anti-collision light accordingly. Particularly, the LED monitor circuitry 76 is configured to shut off the anti-collision light 100 if more than a predetermined number of lower LEDs 10 fail in any one string 75, or if more than another predetermined number of upper LEDs 20 fail in any string 75.

The LED monitor circuitry 76 may be configured so that the predetermined number of allowed failures of lower LEDs 10 in a given string 75 is the same as the predetermined number of failures allowed for upper LEDs 20. Alternatively, the predetermined numbers may be different for lower and upper LEDs 10 and 20, respectively.

According to an exemplary embodiment, the predetermined number is set at one for both types of LEDs 10 and 20. In this embodiment, the LED monitor circuitry 76 is designed to shut down the light 100 if either two or more lower LEDs 10 in any one string 75 have failed, or if two or more upper LEDs 20 in a string 75 have failed. Thus, the LED monitor circuitry 76 of the control system 70 is tailored to keep the light on as long as no more than one upper LED 20 and/or one lower LED 10 in a given string 75 has failed.

Therefore, in the exemplary embodiment described, the anti-collision light 100 could withstand a failure of 12 LEDs—one upper and one lower LED in each of the six strings 75—before it is determined that the light fails to meet photometric requirements and shuts off. On the other hand, in a worst case scenario, a failure of only two LEDs—two upper or two lower LEDs in any of the strings 75—can cause the LED monitor circuitry 76 to shut the light 100 down.

According to a further exemplary embodiment, the LED monitor circuitry 76 contains an LED sensing circuit (not shown in FIG. 4A) to monitor the voltage drop across each LED 10, 20 in the corresponding string 75. LED failures can be caused by either a shorted or open circuit condition. Thus, the LED sensing circuit may be designed to detect failures by detecting both short circuit and open circuit conditions for each given LED. Various methods of designing and implementing such LED sensing circuitry will be readily apparent to those of ordinary skill in the art.

Figure 4B:
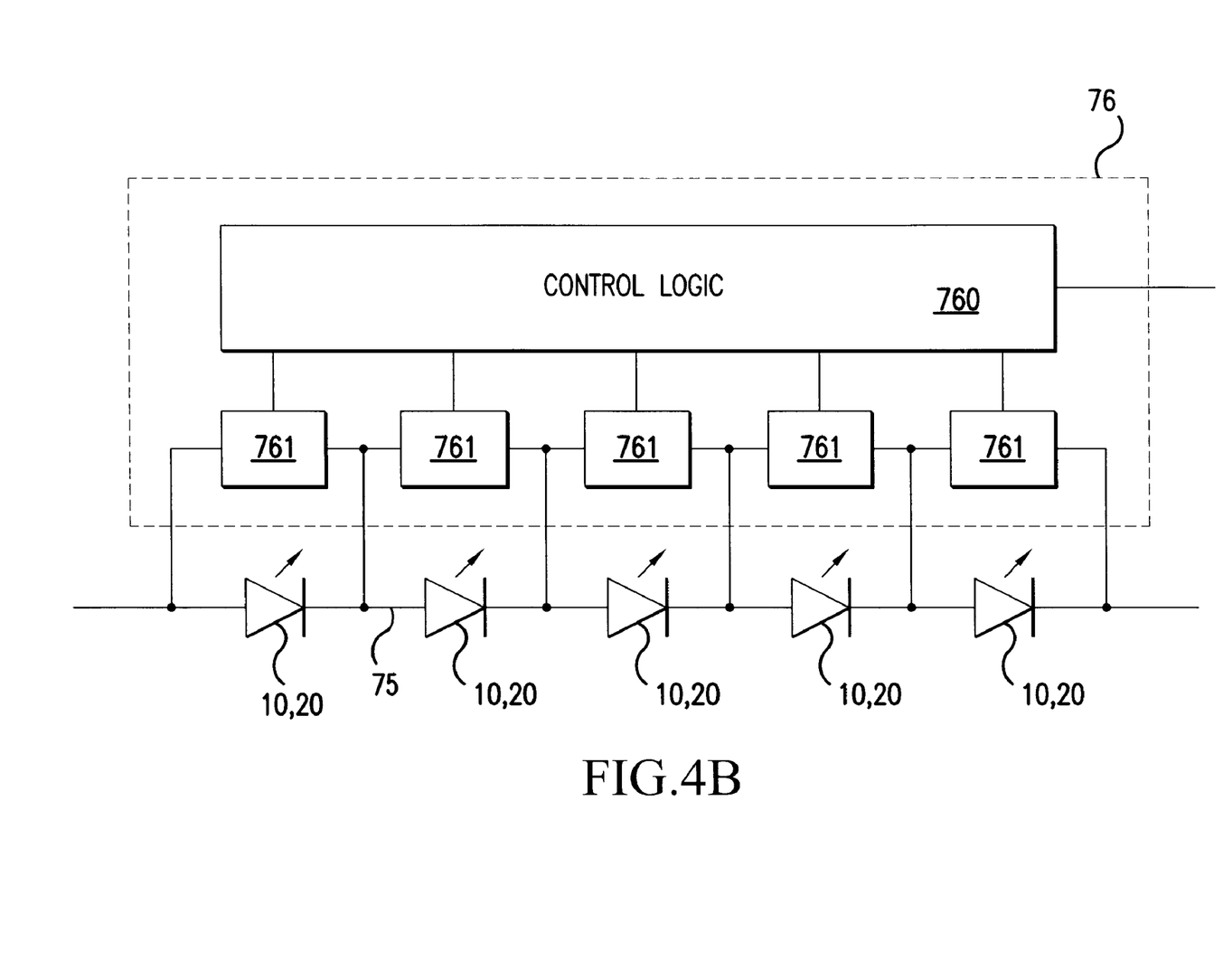
FIG. 4B is a schematic diagram illustrating the LED monitor circuitry, which implements LED sensing circuits, according to an exemplary embodiment.

FIG. 4B illustrates a configuration of the LED monitor circuitry 76, which implements LED sensing circuits 761, according to an exemplary embodiment. As shown in this figure, the LED monitor circuitry 76 includes a LED sensing circuits 761 to monitor the voltage drop across each LED 10, 20 in the string 75. The results of the LED sensing circuit 761 is reported to control logic 760, which determines whether a fault condition has occurred that requires shut-down of the light (i.e., more than a predetermined number of lower LEDs 10 or more than a predetermined number of upper LED 20 has failed). For purposes of this application, "logic" refers to either hardware (e.g., logic circuits, a processor, or a combination thereof), software, or a combination of hardware and software.

Furthermore, although FIG. 4B illustrates a separate LED sensing circuit 761 for each LED 10, 20 in the string 75, it will be readily apparent that the functions of LED sensing circuits 761 may be implemented in a single physical device, separate physical devices, or any combination thereof. It should also be recognized that the LED sensing circuits 761 may be integrated within the same physical device as the control logic 760, or as separate physical units.

In a further exemplary embodiment, the LED monitor circuitry 76 for a given string 75 provides an alternate current path for each LED 10, 20 in the string 75. For example, referring FIG. 4B, the alternate current path may be the path established by one or more LED sensing circuits 761. The alternate current path may allow the anti-collision light 100 to continue to operate in accordance with the above-described LED failure algorithm even when an LED fails due to an open condition.

It should be noted that the illustrations of in FIGS. 4A and 4B should not be considered limiting as to the LED monitor circuitry 76 for each LED string 75. The invention covers any and all variations that will be readily apparent to those of ordinary skill in the art. For example, in alternative exemplary embodiments, the LED monitor circuitry 76 for multiple strings 75 may be combined into a single physical unit or device.

Figure 4C:
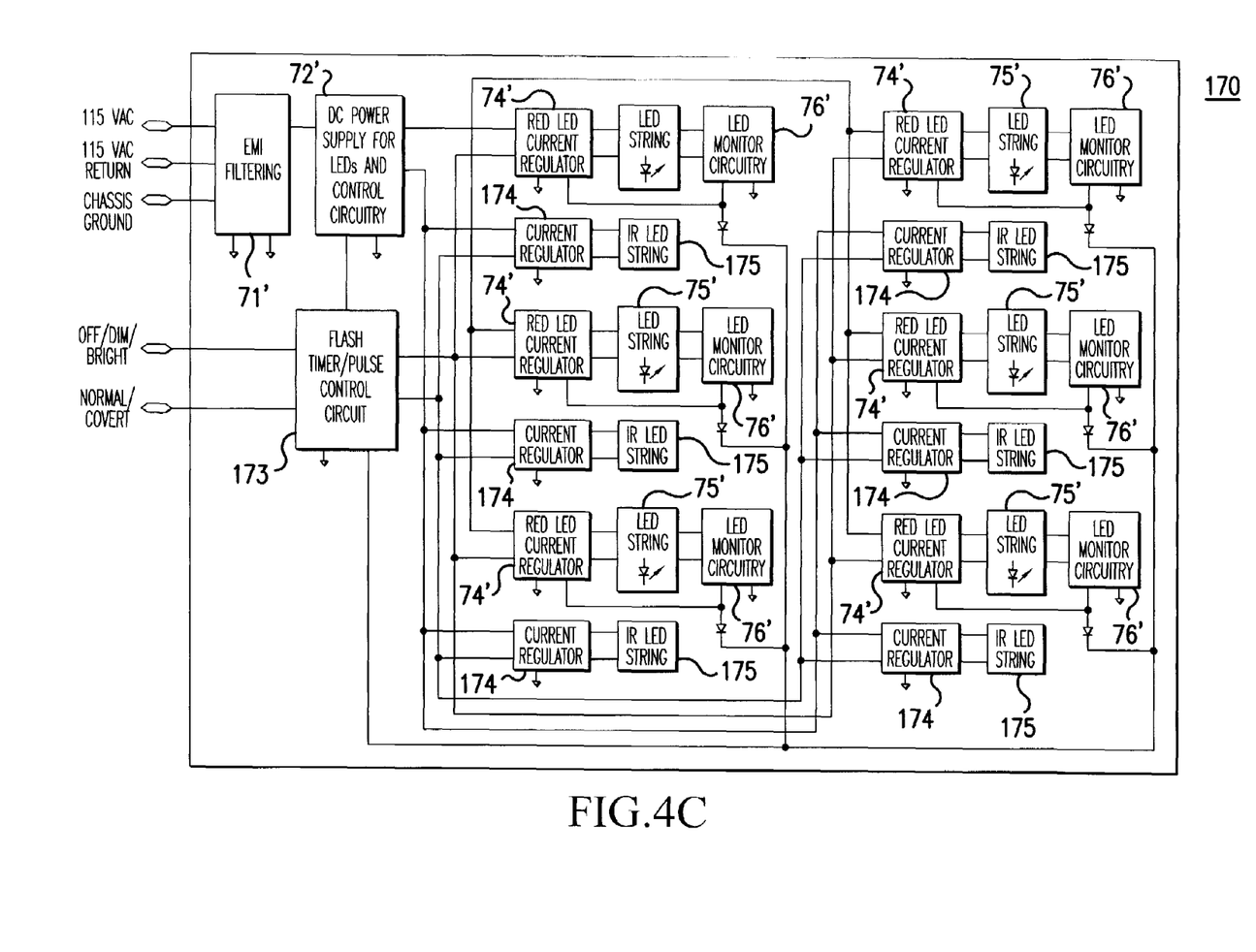
FIG. 4C is a schematic diagram illustrating electrical connections and control for an anti-collision light configured for dual-mode operation, according to an exemplary embodiment.

FIG. 4C illustrates an electrical system 170 (including the electrical connections and control) for an anti-collision light 100, which is configured for dual-mode operation, according to another exemplary embodiment. Specifically, FIG. 4C illustrates a dual-mode embodiment that covers a visible mode and covert mode of operation. As shown in FIG. 4C, the electrical system 170 includes many elements 71', 72', 74', 75', and 76', which operate according to the same principles as described above in connection with elements 71, 72, 74, 75, and 76 in electrical system 70 of FIGS. 4A and 4B. Accordingly, a description of the operation of these elements will not be repeated.

Furthermore, similar to the LED monitor circuitry 76 of electrical system 70 of FIG. 4A, LED monitor circuitry 76' in FIG. 4C may include an LED sensing circuit (not shown) for detecting failures due to open and short circuit conditions. Such an LED sensing circuit may operate according to principles similar to those described above.

However, the electrical system 170 of FIG. 4C differs in certain aspects from the system 70 illustrated in FIG. 4A. For instance, electrical system 170 also includes strings 175 of IR LEDs. According to an exemplary embodiment, there may be six strings 175 of IR LEDs, and each string 175 may consist of four IR LEDs located in the lower ring (first ring) of LEDs 10. Similar to the strings 75 of visible LEDs, all four IR LEDs in a string 175 are wired in series. Furthermore, a current regulator 174 may be provided for each of the six strings 175 of IR LEDs. This approach simplifies the regulation of current in the LEDs while maintaining current regulation in each LED for maximum LED life.

According to an exemplary embodiment, the flash timer/pulse control circuit 173 illustrated in FIG. 4C operates similar to the counterpart circuit 73 in FIG. 4A. However, one exception is that, in an exemplary embodiment, the flash timer/pulse control circuit 173 in FIG. 4C is configured to control switching the operation of the dual-mode anti-collision light 100 from visible mode (where the visible LED strings 75 are illuminated) to a covert mode (where the IR LED strings 175 are illuminated). In this embodiment, the switching between the visible and covert modes may be controlled according to a control signal (Normal/Covert) input to the flash timer/pulse control circuit 173 (as shown in FIG. 4C).

While FIG. 4C illustrates an embodiment covering visible and covert modes of operation, other types of dual-mode anti-collision light 100 are also covered by the present invention. In an alternative exemplary embodiment, the dual modes of operation may correspond to the color of light emitted. For instance, the anti-collision light 100 may include both strings of red LEDs (preferably, "aviation red" LEDs), and strings of white LEDs (preferably, "aviation white" LEDs). In such an embodiment, the anti-collision light 100 can switch between a red-light mode (in which the red LEDs are illuminated in a flashing manner) and a white-light mode (in which the white LEDs are illuminated in a flashing manner). It will be readily apparent to those of ordinary skill in the art how to modify the configuration of the anti-collision light 100 described above in connection with the aforementioned figures to implement this alternative embodiment.

In another exemplary embodiment, the anti-collision light 100 may be configured as a triple-mode light. In such an embodiment, the anti-collision light 100 may include strings of red, white, and IR LEDs. As such, the anti-collision light 100 may be switchable between operating modes of flashing aviation red, aviation white or IR light. In each mode, the anti-collision light 100 may be configured to emit the corresponding type of light in a flashing manner. It will be readily apparent to those of ordinary skill in the art how to modify the configuration of the anti-collision light 100, as described above in connection with the aforementioned figures, to implement this triple-mode embodiment.

In the exemplary embodiments of the anti-collision light 100 described above, the overall scale and size is designed to meet the FAR specifications, taking into account expected light output levels for both high ambient temperature and end-of-life conditions. For example, based on the estimated relationship between junction temperature and light output for red-orange Luxeon LEDs, the output is expected to be approximately 40% less at an ambient temperature of 70 degrees Celsius (translating into a junction temperature of approximately 110 degrees Celsius). Also, end-of-life lumen levels for such LEDs are estimated at 70% of the initial output level. However, due to the basic scalability of the anti-collision light's 100 design, the envelope may be reduced to accommodate alternate design parameters.

As shown in FIGS. 1A and 1B, a lens 60 may be attached to the top platform 40 and base platform 50 and extend around the anti-collision light 100, thereby protecting the LEDs 10, 20 from the environment. According to an exemplary embodiment, the light 100 may be configured so that lens 60 projects from the base platform 50 to the top platform 40 at a vertical angle that is designed to reduce the drag coefficient. In an exemplary embodiment, the lens 60 may project at an angle of approximately 30-45 degrees with respect to the plane of base platform 50, thereby reducing drag.

According to an exemplary embodiment, the overall design of the anti-collision light 100 takes other aerodynamic considerations into account. For example, the relatively large diameter of the base platform 50 with respect to the height helps reduce the protrusion of the anti-collision light 100 into the airflow, thereby reducing the drag coefficient.

However, separating the LEDs 10, 20 into lower and upper rings helps reduce the diameter of the base platform 50, which lowers the drag coefficient by reducing the surface area of the aircraft covered by the anti-collision light 100. Also, the inclusion of cooling fins on the top platform 40 of the light 100 assists in reducing drag. Taking the above factors into consideration, an exemplary embodiment of the anti-collision light 100 may have a relatively small base parameter, e.g., as low as 11.6 inches.

FIG. 5 illustrates locations on an aircraft's fuselage at which the anti-collision light 100 may be mounted, according to an exemplary embodiment. As shown in FIG. 5, an upper fuselage-mounted anti-collision light 100A may be mounted on a top surface of the fuselage, and/or on the vertical stabilizer. FIG. 5 also shows that a lower anti-collision light 100B may be mounted on the bottom surface of the fuselage. Thus, either (or all) of the lights 100A may be used for covering the upper portion of the FAR-specified coverage area (i.e., above the horizontal plane), and 100B may be used for covering the lower portion of the specified coverage area (i.e., below the horizontal plane of the aircraft). As It should be noted that variations in the design and configuration of the anti-collision light 100 may be made without departing from the spirit and scope of the present invention.

Figure 3:
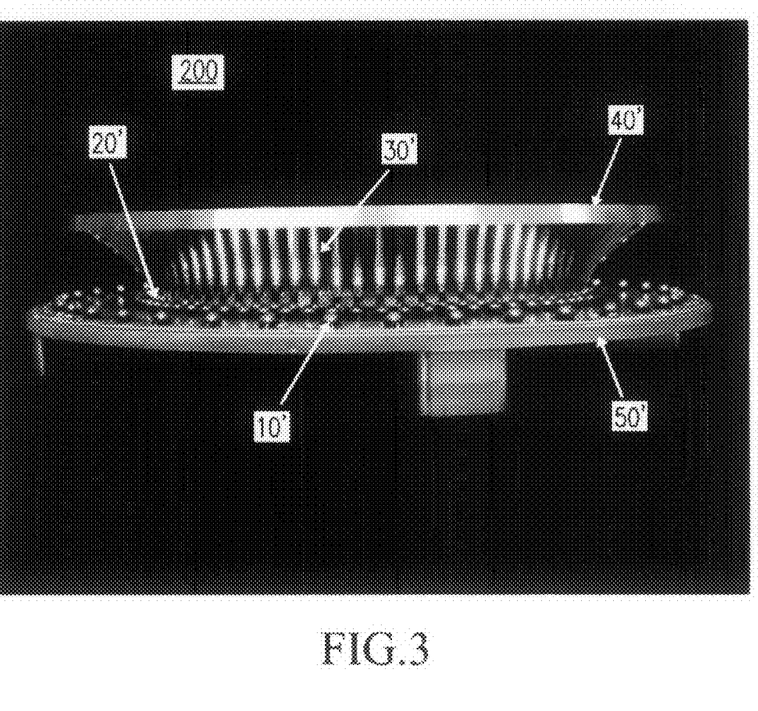
FIG. 3 illustrates an anti-collision light including two concentric rings of light emitting diodes (LEDs) on a base platform, according to an alternative exemplary embodiment of the present invention.

For example, FIG. 3 illustrates an anti-collision light 200, according to an alternative exemplary embodiment. In an exemplary embodiment, the anti-collision light 200 may have two concentric rings of LEDs mounted in the same plane. For instance, FIG. 3 shows the two rings mounted on base platform 50'. Furthermore, FIG. 3 shows that the center portion of the anti-collision light 200 includes a reflector 30'.

In the alternative exemplary embodiment of FIG. 3, the two concentric LED rings include a first (outer) ring of LEDs 10', and a second (inner) ring of LEDs 20'. For this alternative embodiment, consider once again the example where the anti-collision light 200 is mounted on the top of a fuselage or the vertical stabilizer (illustrated as 100A in FIG. 5). The shape of reflector 30' may be optimized to redirect light from the inner ring of LEDs 20' to satisfy FAR specifications for a coverage area in each horizontal direction, extending from 0 to 40 degrees above the horizontal plane of the aircraft. The reflector 30' may be designed to redistribute light from the outer ring of LEDs 10', so that supplemental coverage is provided in an area extending up to, and beyond, 75 degrees above the horizontal plane.

The alternative exemplary embodiment of FIG. 3 may further include a lens (not shown) attached to the top platform 40' and base platform 50', which extends around the light 200. As to the aerodynamics of the light 200, the diameter of the base platform 50' may be set at approximately 15 inches, while the lens is set at a vertical angle of approximately 30-45 degrees, with respect to the base platform 50'. In such a configuration, 112 LEDs 10', 20' may be implemented to meet the FAR specifications.

In the embodiment of FIG. 3, the base platform 50' may be configured as a heat sink for the LEDs 10', 20'. In a further embodiment, heat pipes (not shown) may be implemented to transfer heat from the base platform 50' to the top platform 40'. Also, cooling fins (not shown) may also be included in the top platform 40' to dissipate heat and reduce drag.

The present invention also covers other variations in design and operation. In the above exemplary embodiments, the design of the fuselage-mounted anti-collision light is modular in nature to facilitate implementing several design changes over the life of the light to utilize the latest technology. These design changes may include, but are not limited to, reducing the power supplied to the LED's, reducing the number of LEDs, and switching to a more efficient and/or cost-effective type of LED. The modular design would allow the anti-collision light to maintain its form, fit and function, while updating the technology to what is currently available in the market.

According to another exemplary embodiment, the anti-collision light may be configured to reduce peak power consumption by only flashing certain portions of each LED ring at a time, in a rotating manner. For example, two opposing sections or subsets of LEDs in each ring may be flashing at a particular time. Alternatively, there may be only one section of LEDs, or more than two sections, flashing at a particular time, according to a rotational pattern. In such an embodiment, each flashing section may be configured to satisfy the FAR requirements for its corresponding coverage area, and cross-talk between the sections may be kept at a minimum to satisfy certain perceived flash rate requirements.

It will be readily apparent to those of ordinary skill in the art how to implement and configure control circuitry (e.g., 73 and 173, as illustrated in FIGS. 4A and 4B) to cause the upper and lower rings of LEDs to flash in such a rotational manner. The rotational flashing may be implemented for either embodiment of the anti-collision light 100, 200, which are illustrated in FIGS. 1A and 3, respectively.

What is claimed is:

1. A fuselage-mounted anti-collision light comprising:
   a base platform on which a first plurality of light-emitting diodes (LEDs) are arranged, the first plurality of LEDs being arranged in a symmetrical manner about a vertical axis;
   a top platform on which a second plurality of LEDs are arranged, the second plurality of LEDs being inverted with respect to the first plurality of LEDs; and
   a reflector coupling the top platform and base platform, the reflector having first and second portions that redistribute light from the first and second pluralities of LEDs, respectively,
   wherein, during operation, the anti-collision light is mounted to the exterior of an aircraft fuselage such that the first and second pluralities of LEDs are operationally arranged in a symmetrical manner about a common vertical axis of the aircraft, and
   wherein the diameter of the base platform is larger than the height of the mounted anti-collision light.

2. The anti-collision light of claim 1, wherein the first and second pluralities of LEDs are controlled to flash according to a rate of substantially 46 flashes per minute at a duty cycle of substantially 23%.

3. The anti-collision light of claim 1, wherein the diameter of the base platform is larger than the diameter of the top platform.

4. The anti-collision light of claim 1, wherein
   the second portion of the reflector redistributes the light from the second plurality of LEDs within a coverage area extending above the base plane, the coverage area being substantially symmetrical about the vertical axis.

5. The anti-collision light of claim 4, wherein
   the coverage area extends to substantially 40 degrees above the base plane, and
   the anti-collision light is configured to satisfy minimum intensity requirements corresponding to the coverage area.

6. The anti-collision light of claim 1, wherein at least one of the first and second LEDs are grouped into strings, each string comprising two or more LEDs electrically connected in series.

7. The anti-collision light of claim 6, further comprising:
   one or more current regulators, each electrically connected to a corresponding string of LEDs,
   wherein the current regulator is configured to maintain the current flowing through the corresponding string of LEDs at a predetermined level.

8. The anti-collision light of claim 1, wherein the anti-collision light is configured for at least two modes of operation, each of the modes corresponding to a particular type of light to be emitted in a flashing manner.

9. The anti-collision light of claim 8, wherein
   at least a portion of the first and second pluralities of LEDs are red LEDs, and another portion of the first and second pluralities of LEDs are white LEDs, and
   the anti-collision light is configured to be switchable between the following operating modes: a red-light mode, and a white-light mode.

10. The anti-collision light of claim 1, wherein the diameter of the top platform is smaller than the diameter of the base platform, the anti-collision light further comprising:
    a lens, which projects from the base to the top platform at an angle that reduces a drag coefficient.

11. The anti-collision light of claim 10, wherein the angle of the lens with respect to the base is substantially within the range of 35-40 degrees.

12. The anti-collision light of claim 10, wherein the top platform includes cooling fins, which are configured to further reduce the drag coefficient.

13. The anti-collision light of claim 1, wherein
    the first plurality of LEDs on the base platform are arranged as a first ring of LEDs, and the second plurality of LEDs on the top platform are arranged as a second ring of LEDs.

14. The anti-collision light of claim 13, wherein at least one of the first and second rings of LEDs flashes its LEDs in a rotational pattern, such that only a subset of its LEDs flash at any given time.

15. The anti-collision light of claim 13, wherein
the first portion of the reflector is configured to redistribute the light from the first ring of LEDs in a coverage area, which extends from substantially 0 to 40 degrees above a base plane of the anti-collision light, and
the second portion of the reflector is configured to redistribute the light from the second ring of LEDs in a supplemental coverage area, which extends at least up to substantially 75 degrees above the base plane.

16. The anti-collision light of claim 15, wherein the anti-collision light is configured to satisfy minimum intensity requirements corresponding to the coverage area and the supplemental coverage area.

17. A device comprising:
a plurality of light-emitting diodes (LEDs) on a base, which are arranged in a symmetrical manner about a vertical axis, wherein the LEDs are grouped into strings, each string comprising two or more LEDs electrically connected in series;
a reflector configured to redistribute light from LEDs on the base; and
monitor circuitry for each string of LEDs, the monitor circuitry being configured to monitor the operating status of LEDs in each string, the monitor circuitry being operable to shut off the anti-collision light if a predetermined number of LEDs fail in any string.

18. The anti-collision light of claim 17, wherein
the reflector operably couples the base to a top platform,
a plurality of LEDs are arranged on the top platform, the LEDs on the top platform being inverted with respect to the LEDs on the base,
each string of LEDs includes a plurality of the LEDs on the base and a plurality of the LEDs on the top platform, and
each monitor circuitry is configured to shut down the anti-collision light if at least one of the following occurs with respect to the corresponding string: more than a pre-determined number of the LEDs on the base fail; and more than a pre-determined number of the LEDs on the top platform fail.

19. The anti-collision light of claim 17, wherein the monitor circuitry includes an LED sensing circuit configured to monitor potential voltage drops across the LEDs in a given string, the monitor circuitry being operable to determine a failure in a LED in response to a voltage drop.

20. The anti-collision light of claim 19, wherein the monitor circuitry provides an alternate current path for LEDs in the given string in response to an LED failure.

21. A device comprising:
a plurality of light-emitting diodes (LEDs) on a base, which are arranged in a symmetrical manner about a vertical axis; and
a reflector configured to redistribute light from LEDs on the base, wherein
at least a portion of the LEDs on the base are visible LEDs, which are configured to emit light at a visible wavelength,
the anti-collision light includes a plurality of infrared (IR) LEDs configured to emit light at substantially an IR wavelength, and
the anti-collision light is configured to be switchable between the following operating modes: a visible mode, and an IR mode.

22. The anti-collision light of claim 21, wherein
the visible LEDs include both red and white LEDs, and
the anti-collision light is configured to be switchable between the following operating modes: a visible red-light mode, a visible white-light mode, and an IR mode.

23. The anti-collision light of claim 21, wherein
the visible LEDs are grouped into strings, each comprising two or more visible LEDs electrically connected in series, and
the IR LEDs are grouped into strings, each comprising two or more IR LEDs electrically connected in series.

24. The anti-collision light of claim 23, further comprising:
a first set of one or more current regulators, each electrically connected to a corresponding string of LEDs; and
a second set of one or more current regulators, each electrically connected to a corresponding string of IR LEDs,
wherein each current regulator in the first and second sets is configured to maintain the current flowing through the corresponding string of LEDs at a predetermined level.

* * * * *